Figures 1, 2:
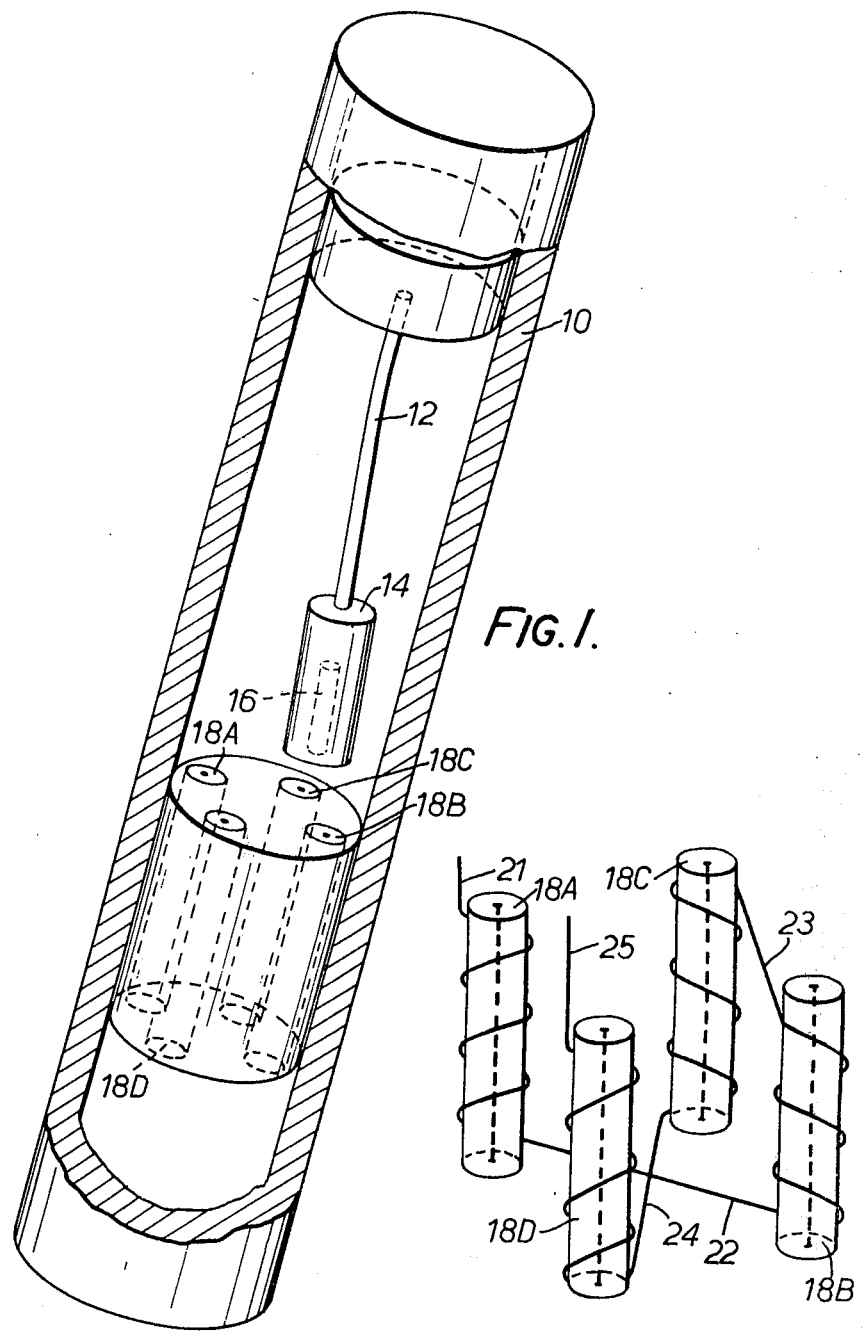

United States Patent [19]

Russell et al.

[11] 3,935,643

[45] Feb. 3, 1976

[54] METHODS OF AND MEANS FOR MEASURING ANGLES

[76] Inventors: Michael King Russell, 3, Culross Close; Anthony William Russell, 265, Old Bath Road, both of, Cheltenham, England

[22] Filed: Nov. 29, 1974

[21] Appl. No.: 528,391

[30] Foreign Application Priority Data
Dec. 12, 1973 United Kingdom............... 57645/73

[52] U.S. Cl................... 33/312; 33/366; 324/34 D
[51] Int. Cl.².............................G01C 9/04; G01C 9/14
[58] Field of Search..................... 33/304, 312, 366; 324/34 PS, 34 D

[56] References Cited
UNITED STATES PATENTS
3,805,398  4/1974  Russell et al............................ 33/366

FOREIGN PATENTS OR APPLICATIONS
141,501  8/1953  Sweden................................. 33/312

OTHER PUBLICATIONS
IBM Technical Disclosure Bulletin, L. F. Shew, Vol. 6, No. 5, Oct. 1963, "Magnetic-Null Transducer".

*Primary Examiner*—William D. Martin, Jr.
*Attorney, Agent, or Firm*—Young & Thompson

[57] ABSTRACT

Apparatus is provided for measuring both the angle between the vertical and a particular axis of a body and the azimuth angle of the displacement of such axis from the vertical. The body houses a trasnducer having a bar magnet mounted on the free end of a pendulum beam and confronting four solenoids forming two differential fluxgate pairs disposed symmetrically with respect to the neutral position of the pendulum beam. The two differential fluxgate pairs are preferably so interconnected that the magnetic flux in each fluxgate pair is equal to zero.

8 Claims, 7 Drawing Figures

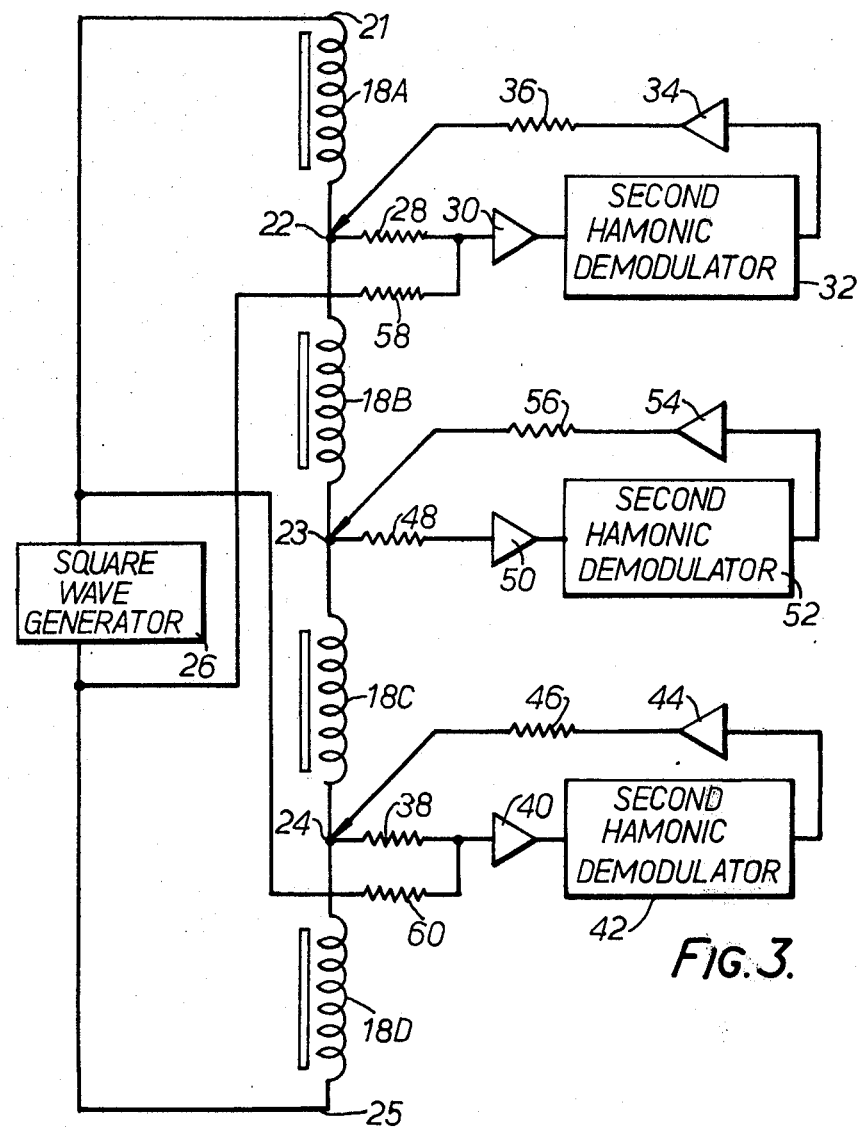
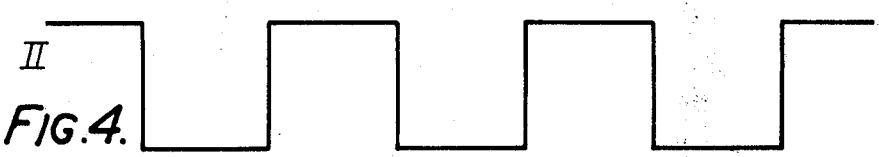
Fig. 3.
Fig. 4.

TRANSDUCER BODY HIGH-SIDE

VERTICAL PLAN THROUGH TRANSDUCER BODY AXIS

METHODS OF AND MEANS FOR MEASURING ANGLES

This invention relates to methods of and means for measuring angles for remote indication and is of particular application to the drilling and/or surveying of deep boreholes.

According to the invention, there is provided apparatus for measuring both the angle between the gravity vector and a particular axis of a body and the angle between the direction of projection of the gravity vector on to a plane at right angles to said particular axis and an axis fixed with respect to said body and lying in said plane, comprising a transducer having a bar magnet mounted on the free end of a pendulum beam and four solenoids forming two differential fluxgate pairs confronting said magnet and disposed symmetrically with respect to the neutral position of the pendulum beam.

Preferably, said differential fluxgate pairs are so interconnected that, in use, the magnetic flux in each respective fluxgate pair is equal to zero.

Said fluxgate pairs are conveniently afforded by matched solenoids each of which contains a mu-metal rod, the solenoids being so arranged that the axes of the rods are mutually parallel and are disposed in equispaced relationship. The solenoids are conveniently used in conjunction with a transducer comprising a bar magnet mounted in a pendulum bob and beam assembly which is itself mounted, together with the solenoids, inside a tubular housing in such way that the axes of the magnet, beam, solenoids and housing are parallel when the axis of the housing is parallel to the gravity vector.

Figure 5:
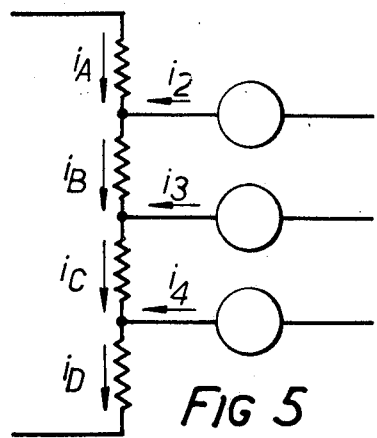
Figure 7:
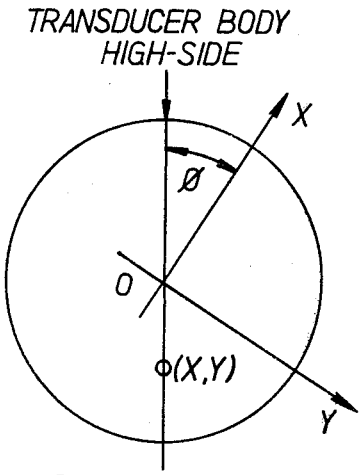
Figure 6:
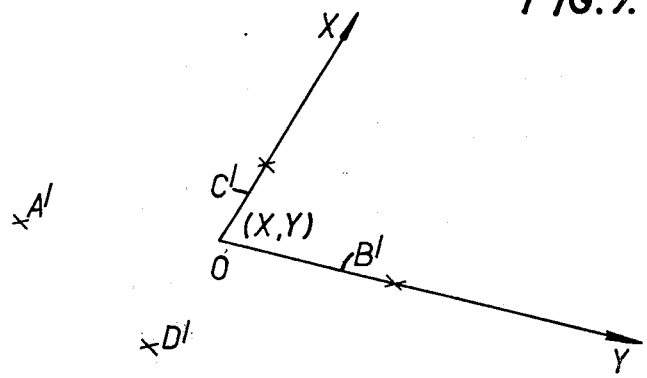
Figure 6:
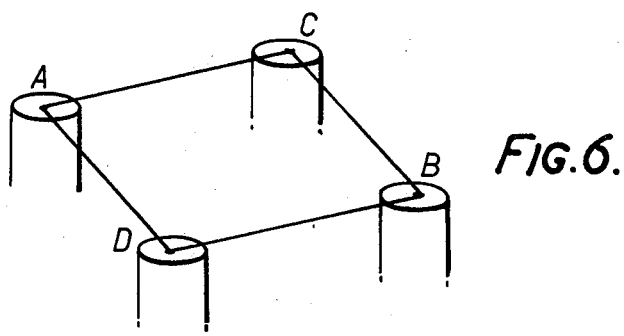

The invention as applied to the drilling and/or surveying of deep boreholes will now be described by way of example with reference to an embodiment thereof which is shown in the accompanying drawings, in which:

FIG. 1 is a partially broken away perspective view of a transducer assembly in accordance with the invention, FIG. 2 is a schematic diagram illustrating the relative positions and the directions of the windings of the solenoids of the assembly shown in FIG. 1, FIG. 3 is a diagram of the electrical circuit for use with the transducer assembly of FIG. 1, FIG. 4 is a waveform diagram illustrating the phase relationship between the drive waveforms for the circuit shown in FIG. 3, FIG. 5 is a D.C. equivalent circuit diagram of the transducer assembly, and FIGS. 6 and 7 are schematic diagrams illustrating the relationship of the transducer assembly to various reference directions.

Referring to FIG. 1, a tubular body 10 contains a stiff pendulum beam 12 having a pendulum bob 14 mounted on its free end. A bar magnet 16 is mounted in the pendulum bob 14 with its axis parallel to the pendulum beam 12 when the matter is in its relaxed position with its axis parallel to the gravity vector. Thus, under the action of gravity, the bar magnet 16 undergoes small lateral deflections in a manner which is controlled with respect to the transducer housing 10.

The housing 10 also contains four identical matched solenoids $18_A$, $18_B$, $18_C$ and $18_D$, each containing a mu-metal rod lying along its axis and terminating at the ends of the solenoid, are positioned in spaced relationship with the mu-metal rods parallel and with the two sets of rod ends defining two parallel planes. The ends of the mu-metal rods lie at the corners of a square in the plane they define. The spatial arrangement of the solenoids and the direction of the windings on each solenoid are shown in FIG. 2.

The sensing head solenoid arrangement is incorporated into the circuitry which is in accordance with the block diagram shown in FIG. 3. The solenoid $18_A$ is connected between circuit points 21 and 22, the solenoid $18_B$ between circuit points 22 and 23, the solenoid $18_C$ between circuit points 23 and 24 and the solenoid $18_D$ between the circuit points 24 and 25. The circuit points 21 and 25 are connected to the output of a square wave generator 26 which is balanced with respect to earth.

The circuit point 22 is connected via a resistor 28 and pre-amplifier 30 to a second harmonic demodulator 32, the D.C. output of which is fed back via a high gain amplifier 34 and resistor 36 to the circuit point 22. Thus, the solenoids $18_A$ and $18_B$ form a differential fluxgate pair. Similarly, the circuit point 24 is connected via a resistor 38 and pre-amplifier 40 to a second harmonic demodulator 42, the D.C. output of which is connected by a high gain amplifier 44 and resistor 46 back to the circuit point 24 so that the solenoids $18_C$ and $18_D$ form a differential fluxgate pair. The circuit point 23 is connected via a resistor 48 and a pre-amplifier 50 to a second harmonic demodulator 52, the D.C. output of which is connected via a high gain amplifier 54 and a resistor 56 to the circuit point 23 so that the two differential fluxgate pairs formed by solenoids $18_A$, $18_B$ and $18_C$, $18_D$ respectively together form a standard fluxgate pair. This has the effect of forcing the condition that the resultant magnetic flux in all solenoids is zero.

The second harmonic demodulators 32, 42 and 52, are, of course, tuned to demodulate the second harmonic of the output of the output of the square wave generator 26. FIG. 4 shows the relationship between the output of the square wave generator 26 (waveform I) and each of the second harmonic demodulator drives (waveform II). The equivalent D.C. circuit of the fluxgate pairs is shown in FIG. 5.

Since the output of the square wave generator 26 is balanced with respect to earth, the signal at the fundamental frequency at the circuit point 23 is zero but a signal at the fundamental frequency is present at circuit points 22 and 24. In order to reduce the magnitude of this signal, and thereby, the magnitude of the total signal to be passed by the pre-amplifiers 30 and 40, inverse signals at the fundamental frequency are fed from the output of the square wave generator 36 to the inputs of the pre-amplifiers 30 and 40 via respective resistors 58 and 60.

The resultant magnetic flux in any solenoid can be written in the form $B = f(\mu) \{ H + \text{constant} \cdot i \}$ where $f(\mu)$ is a function of the permeability of the mu-metal rod contained in the solenoid, $H$ is the magnetising force at the centre of the solenoid due to external influences and $i$ is the direct current flowing through the solenoid. Thus, for the solenoids A, B, C and D, the magnetic flux within these solenoids can be represented as follows:

$$B_A = f(\mu_A) \{ H_A - k \cdot i_A \}$$
$$B_B = f(\mu_B) \{ H_B - k \cdot i_B \}$$
$$B_C = f(\mu_C) \{ H_C + k \cdot i_C \}$$
$$B_D = f(\mu_D) \{ H_D + k \cdot i_D \}$$

The D.C. feedback into point 22 forces the condition $B_A = B_B$ and the D.C. feedback into point 24 forces the condition $B_C = B_D$. Thus, if the permeabilities of the mu-metal rods are equal, $H_A - H_B$ is proportional to $i_A - i_B$ and $H_C - H_D$ is proportional to $i_C - i_D$. However, in practice, the permeabilities of the rods are not exactly equal and do not necessarily change in a similar manner with temperature. Since it is desirable to eliminate changes due to variations in permeability, D.C. is fed back into point 23 to force the further condition $\dot{B}_A = B_B = B_C = B_D = 0$. Thus, $H_A - H_B = K \cdot (i_A - i_B)$ and $H_D - H_C = K \cdot (i_C - i_D)$.

Since, from FIG. 5, $i_A - i_B = -i_2$ and $i_C - i_D = i_4$, then $H_B - H_A = K \cdot i_2$ and $H_C - H_D = K \cdot i_4$.

The outputs $V_Y$ and $V_X$ are proportional to $i_2$ and $i_4$ respectively and, thus, are proportional to $H_B - H_A$ and $H_C - H_D$ respectively.

The two angles determined from the measured voltages are:

i. $\theta$, the angle between the vertical direction and a particular axis of the sensing head and ii. $\phi$, the angle between the direction of the projection of the gravity vector on to a plane fixed at right angles to the particular axis and an axis fixed with respect to the sensing head and lying in this plane.

Reference will now be made to FIG. 6 which shows a plane parallel to the plane containing one set of mu-metal rod-ends (A,B,C,D,). If the axes of the solenoids are produced to cut this plane at positions A',B',C' and D', the D'C' defines the OX direction and A'B' defines the OY direction.

It can be shown that the magnetising force due to a magnetic pole located at co-ordinates $(x,y)$ in the OXY plane is such that $H_C - H_D = K_1 \cdot x$ and $H_B - H_A = K_2 \cdot y$, where $K_1$ and $K_2$ are constants, provided that the co-ordinates $x$ and $y$ are small compared with the distances between the solenoids.

A close approximation to this theoretical configuration is achieved by mounting a bar magnet with its axis parallel to the mu-metal rods and with one end terminating in the OXY plane at O. Thus, for small lateral displacements of the magnet, the magnetising force due to the magnet is such that $H_C - H_D = K_1 \cdot x$ and $H_B - H_A = K_2 \cdot y$, where $x$ and $y$ represent the lateral displacements measured with respect to the OXY co-ordinate system. Since $H_C - H_D$ is proportional to $V_X$ and $H_B - H_A$ is proportional to $V_Y$, then $V_X$ is proportional to $x$ and $V_Y$ is proportional to $y$.

Since the pendulum bob and beam assembly is mounted, together with a sensing head, inside an outer transducer body tube in such a way that the axes of the magnet, beam, solenoids and the body are parallel, the position of one end of the bar magnet is $x = 0$ and $y = 0$ when the body axis is vertical. Referring to FIG. 7, if the transducer is then tilted from the vertical such that the angle between the vertical and the body axis is $\theta$ and the stiffness of the beam is such that the end of the bar magnet deflects to a position $(x,y)$ where $x$ and $y$ are small deflections, then $(x^2 + y^2)^{1/2}$ is proportional to $\sin \theta$ and $\tan \phi = (-y)/x$ defines the angle $\phi$ between the OX direction and the high-side of the transducer body. (See FIG. 7).

Thus, $\theta$ and $\phi$ are uniquely determined from $\sin \theta = K_1 (V_X^2 + V_Y^2)$ and $$\tan \phi = K_2 \cdot \frac{-V_Y}{V_X},$$

where $K_1$ and $K_2$ are constants.

We claim:

1. Apparatus for measuring both the angle between the gravity vector and a particular axis of a body and the angle between the direction of projection of the gravity vector on to a plane at right angles to said particular axis and an axis fixed with respect to said body and lying in said plane, comprising a transducer having a pendulum beam bar magnet mounted on the free end of said pendulum beam, four solenoids forming two differential fluxgate pairs confronting said magnet and disposed symmetrically with respect to the neutral position of the pendulum beam and means interconnecting said differential fluxgate pairs whereby, in use, the magnetic flux in each respective fluxgate pair is equal to zero.

2. Apparatus as claimed in claim 1, in which the means interconnecting the two differential fluxgate pairs are so arranged that the two differential flux gate pairs form a standard fluxgate pair so that the resultant magnetic flux in all solenoids is equal to zero.

3. Apparatus as claimed in claim 2, including a fixed frequency alternating current supply connected to said solenoids, each fluxgate pair including a high gain amplifier responsive to the second harmonic of the signal at the junction of the solenoids forming said fluxgate pair and arranged to supply a D.C. signal to such junction.

4. Apparatus as claimed in claim 3, including a respective second harmonic demodulator in each of said feedback loops and means for feeding a signal of the same frequency but opposite polarity to the alternating current supply to the input of the second harmonic demodulators of each of the differential fluxgate pairs.

5. Apparatus as claimed in claim 1, in which each differential fluxgate pair comprises a pair of matched solenoids each of which contains a mu-metal rod.

6. Apparatus as claimed in claim 5, in which said solenoids are so arranged that the axes of the rods are mutually parallel and are disposed in equi-spaced relationship.

7. Apparatus as claimed in claim 1, in which the pendulum comprises a pendulum bob and beam assembly and the bar magnet is mounted in the pendulum bob.

8. Apparatus as claimed in claim 1, in which the solenoids and pendulum assembly are mounted in a tubular housing in such a way that the axes of the magnet, beam, solenoids and housing are parallel when the axis of the housing is parallel to the gravity vector.

* * * * *